United States Patent
Kolbe et al.

(10) Patent No.: US 9,243,349 B2
(45) Date of Patent: Jan. 26, 2016

(54) FUNCTIONAL CELLULOSIC MOLDINGS

(75) Inventors: Axel Kolbe, Neundrof (DE); Hardy Markwitz, Rudolstadt (DE)

(73) Assignee: smartpolymer GmbH, Rudolstadt (DE)

( * ) Notice: Subject to any disclaimer, the term of this patent is extended or adjusted under 35 U.S.C. 154(b) by 277 days.

(21) Appl. No.: 13/058,606

(22) PCT Filed: Aug. 25, 2009

(86) PCT No.: PCT/EP2009/006144
§ 371 (c)(1),
(2), (4) Date: Feb. 11, 2011

(87) PCT Pub. No.: WO2010/025858
PCT Pub. Date: Mar. 11, 2010

(65) Prior Publication Data
US 2011/0135701 A1 Jun. 9, 2011

(30) Foreign Application Priority Data
Sep. 2, 2008 (DE) .................. 10 2008 045 290

(51) Int. Cl.
| | | |
|---|---|---|
| A01N 25/00 | (2006.01) | |
| D01F 11/02 | (2006.01) | |
| D03D 1/00 | (2006.01) | |
| D04H 13/00 | (2006.01) | |
| A01P 1/00 | (2006.01) | |
| A01N 59/16 | (2006.01) | |
| D01F 2/02 | (2006.01) | |
| C08L 1/02 | (2006.01) | |
| D01F 1/04 | (2006.01) | |
| D01F 1/10 | (2006.01) | |

(52) U.S. Cl.
CPC ... *D01F 2/02* (2013.01); *C08L 1/02* (2013.01); *D01F 1/04* (2013.01); *D01F 1/103* (2013.01); *Y10T 442/2525* (2015.04)

(58) Field of Classification Search
CPC ............. D01F 1/103; D01F 1/04; D01F 2/02; C08L 1/02; Y10T 442/2525
See application file for complete search history.

(56) References Cited

U.S. PATENT DOCUMENTS

| | | | | |
|---|---|---|---|---|
| 2,442,973 A | * | 6/1948 | Edelstein | ........................ 8/115.6 |
| 5,595,750 A | * | 1/1997 | Jacobson et al. | ............... 424/421 |
| 7,074,482 B1 | | 7/2006 | Nishimura et al. | |

FOREIGN PATENT DOCUMENTS

| | | | |
|---|---|---|---|
| CN | 1442518 A | | 9/2003 |
| CN | 1687509 A | | 10/2005 |
| CN | 1800454 A | | 7/2006 |
| CN | 1687 509 | | 9/2006 |
| DE | 44 26 966 A1 | | 2/1996 |
| DE | 19537726 A1 | * | 4/1997 |
| DE | 198 02 588 A1 | | 7/1999 |
| DE | 1999 34 436 A1 | | 1/2001 |
| DE | 10 2007 019 768 A1 | | 11/2008 |
| EP | 0 043 325 A1 | | 1/1982 |
| EP | 1 270 776 A1 | | 1/2003 |
| EP | 1 560 953 A1 | | 5/2004 |
| EP | 2 116 557 A | | 11/2009 |
| JP | 08060413 A | | 3/1996 |
| JP | 09-255702 | | 9/1997 |
| WO | WO 02/22924 A1 | | 3/2002 |
| WO | WO 2008/131720 A1 | | 11/2008 |

OTHER PUBLICATIONS

Becheri et al. "Synthesis and characterization of zinc oxide nanoparticles: application to textiles as UV-absorbers" J Nanopart Res (2008), vol. 10, pp. 679-689.*
Oh et al., "Preparation of Regenerated Cellulose Fiber via Carbonation (II)-Spinning and Characterization—" Fibers and Polymers (2005), vol. 6, No. 2, pp. 95-102.*

* cited by examiner

*Primary Examiner* — Abigail Fisher
*Assistant Examiner* — Daniel L Branson
(74) *Attorney, Agent, or Firm* — ProPat, L.L.C.

(57) ABSTRACT

The invention relates to cellulosic moldings having very finely distributed zinc pigments after the dry-wet extrusion method. Cellulosic moldings formed in accordance with the inventive methods, compared to unmodified cellulose fibers, have a high degree of whiteness combined with greatly increased UV light absorption and a wash-resistant bactericidal effect, while at the same time having unrestricted textile processability. The cellulosic functional moldings produced according to the invention are particularly suited for use in textiles for clothing, technical textiles, recreation, medicine, and cosmetics.

14 Claims, No Drawings

FUNCTIONAL CELLULOSIC MOLDINGS

CROSS-REFERENCE TO RELATED APPLICATIONS

This application is being filed under Rule 1.371 as a National Application of pending International Application No. PCT/EP2009/006144 filed Aug. 25, 2009, which claims priority to parent application German Patent Application No. 10 2008 045 290.4, filed Sep. 2, 2008. Both International Application Nos. PCT/EP2009/006144 and German Patent Application No. 10 2008 045 290.4 are hereby incorporated by reference herein in their entirety.

FIELD OF THE INVENTION

This invention relates to cellulosic moldings incorporating very finely divided zinc pigments, obtainable by the dry-wet extrusion process. This process leads to cellulosic moldings which, compared with unmodified cellulosic fibers, evince a high whiteness combined with a substantially enhanced UV light absorbance and a wash-durable and adjustable bactericidal performance coupled with uncurtailed textile processability. These cellulosic moldings are useful for all forms of textile processing such as fiber or filament spinning, yarn production, dyeing, weaving, knitting, web laying.

The cellulosic functional moldings are specifically useful in textiles/fabrics for apparel, technical/industrial textiles, leisure medicine and cosmetics.

BACKGROUND OF THE INVENTION

Zinc oxide is colorless, and because it absorbs UV light below 380 nm wavelengths it is used as a UV absorber. It is similarly known that zinc compounds have bactericidal and fungicidal properties. In textiles, for example, this effect has been described for the production of a bactericidal polyamide filament, U.S. Pat. No. 7,074,482, a bactericidal PET fiber, CN1800454, modified cotton, CN1687509, viscose, JP8060431, viscose, acrylic fibers, PVC fibers, CN1442518, fibers comprising thermoplastic matrix and zinc sulfide, EP1 560 953 (whose United States equivalents are U.S. Patent Application Publication Nos. 2010/047366A1 and 2006/208390A1).

JP 08-060431 A describes viscose (rayon) fibers having antibacterial, deodorizing properties. The antibacterial properties are achieved by mixing the viscose with ceramic complexes. The ceramic complexes are obtained from a mixture of a) magnesium oxide, b) quartzite or zinc oxide and c) hornblende, zeolite or calcium oxide, which is subsequently fired. However, the maximum possible fraction of antibacterially active ceramic complexes in the viscose is relatively low. The coagulation and regeneration of the cellulose in the course of the production of viscose fibers always takes place in acidic coagulation and regeneration baths.

DE 198 02 588 A1 (whose United States equivalent is U.S. Pat. No. 6,514,609) provides luminescent fibers, more particularly luminescent cellulosic fibers obtainable by the viscose process or by the NMMO process. They contain inorganic luminophore pigments which, on stimulation with visible or ultraviolet radiation, preferably display a phosphorescent effect. Transition metal- or lanthanoid-doped zinc sulfides, oxides, oxysulfides, silicates or aluminates are mentioned specifically. Silver-doped zinc sulfides display blue fluorescence for example. However, transition elements or lanthanoid elements can bring about an autocatalyzed, strongly exothermic decomposition of the NMMO.

EP 0 043 325 A1 (whose United States equivalent is U.S. Pat. No. 4,280,925) describes filter materials comprising cellulose ester material which contain zinc sulfide or zinc oxide. The filter materials can be used to filter heavy metal ions, such as silver, mercury, lead, copper or cadmium out of aqueous solutions. The cellulose esters mentioned are cellulose acetate, cellulose butyrate and cellulose propionate and also mixtures thereof.

Moldings, specifically fibers and filaments, with antibacterial or antifungal activity are disclosed in WO 2004/044284 A1 (whose United States equivalents are United States Patent Application Publication Nos. 2010/047366A1 and US 2006/208390A1). The activity is achieved via a zinc sulfide content. The proportion of zinc sulfide ranges from 0.01% to 10% by weight, based on the weight of the polymeric material which forms the molding. Polymeric materials specifically mentioned are polyurethanes, polyesters, polyamides, acrylic polymers, polyolefins, cellulose or cellulose esters.

DE 44 26 966 A1 discloses a process for producing highly filled and oriented cellulosic fibers and films by a specific dry-wet spinning process. The fillers used are finely divided substances, for example metal powders or ceramic substances. The proportion of filler can be up to more than 500% by weight, based on the weight of the cellulose.

DE 10 2007 019 768 A1 (whose United States equivalent is United States Patent Application Publication No. US 2010/124861) discloses a process for producing antibacterially additized cellulosic fibers of high whiteness. The fibers are produced by a lyocell process. The antibacterial performance is achieved through the addition of silver-containing nanoparticles.

The processes described all lead to moldings wherein the effect of the zinc compounds decreases greatly with the number of washes, and often textile processing is severely curtailed at high concentrations of zinc compounds.

SUMMARY OF ADVANTAGEOUS EMBODIMENTS OF THE INVENTION

The present invention has for its object to produce a permanently bactericidally endowed white cellulosic molding which is dyeable without restriction in terms of color. The present invention further has for its object to engineer the release rate of the bactericide. Of particular importance under this condition is a high durability to washing and retention of the whiteness on exposure to light. The present invention yet further has for its object to impair the textile parameters only minimally, if at all, not withstanding the high pigment content. The moldings, moreover, shall display a high UV absorbance.

DETAILED DESCRIPTION OF ADVANTAGEOUS EMBODIMENTS OF THE INVENTION

We have found that this object is achieved according to the present invention by a cellulosic molding having high whiteness and antibacterial properties, which contains zinc-containing pigments and is characterized in that at least some of the zinc of the zinc-containing pigments is present in the form of zincates and attached to the cellulose.

Cellulosic moldings containing a mixture or mixed-crystals of zinc oxide (zinc white) and zinc sulfide display particularly marked antibacterial properties.

The cellulosic moldings of the present invention, specifically the cellulosic fiber of the present invention, have unlimited dyeability, display a high UV absorbance, high durability to washing, i.e., the antibacterial properties are not lost even after many washes, and also unlimited textile processability.

The cellulosic molding is obtainable from a cellulosic molding and spinning solution which has been mixed with water-insoluble zinc pigments and has a pH of 7 or more, by the mixture being molded into the molding in a dry-wet extrusion process and the cellulose being coagulated in an aqueous coagulation bath.

It is important that the molding is produced by a process which involves neutral or basic conditions, but not acidic ones. It is only under these conditions that zinc on the surface of the zinc pigments is transformed into zincate anions which are in a state of particularly strong attachment to the cellulose. The zinc is then released again at a very slow rate only. Fibers thus additized can readily be washed 50 times without losing their bactericidal performance. Zincates here refers to anions of the (only theoretically existing) oxo- and hydroxoacids of zinc, such as $ZnO_2^{2-}$ or $Zn(OH)_3^-$.

The zinc pigments preferably have a maximum particle size of less than 15 μm. Particular preference is given to zinc-based white pigments, such as oxygen-based zinc white, ZnO; as well as zinc sulfide. The zinc pigments can be used individually or in combination.

The combination of zinc oxide pigments with zinc sulfide pigments offers particular advantages.

The proportion of zinc pigment is generally in the range from 0.1% to 30% by weight, preferably in the range from 1% to 25% by weight and more preferably in the range from 5% to 20% by weight, all based on the weight of the cellulose. However, the incorporation of zinc sulfide frequently confers a slightly greenish tinge on the appearance of the end product.

The spinning solution is obtainable for example by dissolving cellulose in a tertiary amine oxide, preferably n-methyl-morpholin-n-oxide and a non-solvent, preferably water. In addition, it is also possible to use ionic liquids as solvents for the cellulose in the production of the spinning solution.

Both processes provide the cellulose moldings by dry-wet extrusion which even at a high pigment content makes available a textile-processable fiber having a high whiteness and an unlimited dyeability, comparable to classic cellulosic fibers.

In the case of cellulosic moldings produced using viscose, there is no formation of a zincate envelope and the zinc is accordingly bonded to the cellulose very much less strongly. Therefore, the bactericidal performance will deteriorate severely after just a few washes (low durability to washing).

High textile-physical values and a textile processability are ensured at a proportion of zinc pigments up to 30% (w/w) of the cellulose weight. Even higher fill levels are possible for fibrous nonwoven web applications. The bactericidal effect of zinc white, described in the literature, was also detectable in the cellulosic moldings of the present invention. This effect is sufficient for use in textile single-trip applications. However, in the case of frequently washed textiles, such as knitted outer- or underwear, the release of soluble zinc decreases with the number of washes, even though there is still sufficient zinc white present in the fibers. It is perfectly surprising that this defect of conventional zinc-based fibers is overcome through the combination of cellulose and of the mixture of zinc white and zinc sulfide. When zinc white and zinc sulfide are used in a cellulosic fiber, the swellability of the cellulose ensures a longer-lasting enhanced release, since the entire cross section of the molding is water accessible and hence all incorporated pigments are involved in the zinc release. The number of washes which can be performed without losing the bactericidal properties increases distinctly.

Sulfate was detected in eluates of the pigment-containing moldings. This amounts to a detection of an autoxidation of zinc sulfide fractions to zinc sulfate in the cellulose matrix. The dramatically increased solubility causes the sulfate to be washed off the molding in the course of the next wash, and results in the sulfate making a significant contribution to the bactericidal performance. But it is only the combination of zinc white and zinc sulfide which surprisingly leads to the sought combination between wash durability and bactericidal performance of the fiber throughout the life cycle of the textile fiber. The comparatively more stable zinc white and the less stable zinc sulfide complement each other supremely and together lead to a sufficient zinc ion release over at least 50 machine washes. At the same time, the textile-physical parameters of the molding are only minimally impaired, if at all, at a high pigment content. Fine zinc pigments in a particularly homogeneous dispersion can even lead to an improvement in strength at a concentration below 5% (w/w). This effect opens the way to a novel product, the white, fully dyeable cellulosic molding with adjustable bacteriostatic-bactericidal activity, which remains biologically active over many washes and which at the same time evinces a UV absorbance and the textile processability of which is ensured even at high pigment content.

The following compositions are conceivable in line with the intended use:

Single trip applications, such as primary wound dressings, plasters, patches, hygiene products, cosmetic applications, shoe insoles and disposable filters, can utilize cellulose knit fibers incorporating purely zinc white or purely zinc sulfide in accordance with the intended use life, but mixtures of, for example, 0.5-5% of zinc sulfide and 95-99.5% of zinc white are also conceivable.

In the case of applications involving 1-5 washes, such as shoe inliner, mattress fabric, domestic textiles, lining fabrics, textiles in a vehicle interior, mixtures of 0-50% of zinc sulfide and 50-100% of zinc white are conceivable.

For applications involving more than 5 washes and for products in the outdoors sector, mixtures between 0-90% of zinc sulfide and 10-100% of zinc white are conceivable.

Release rate and wash durability can be varied via the ratio of zinc white to zinc sulfide.

It is particularly in the outdoors sector where this fiber is very useful, since it evinces an effective UV absorbance through the zinc pigments.

The release from the zinc pigments makes it possible to produce not just textiles consisting of purely zinc pigment-containing cellulosic fibers, but also blends between 1 and 100%, preferably 5 to 20% of the overall textile being attributable to a fiber fraction which is in accordance with the present invention. In this connection, an overall proportion of zinc pigments in the textile in the range from 0.1 to 20% is conceivable and sensible.

What is claimed is:

1. A cellulosic fiber having high whiteness and antibacterial properties comprising zinc-containing pigments mixed within the fiber cross-section,
wherein the zinc containing pigments comprise at least one member selected from the group consisting of zinc oxide and zinc sulfide and at least some of the zinc on the surface of the zinc-containing pigments is present in the form of zincate anions attached to the cellulose, and the zinc-containing pigments have a particle size of below 15 μm,
said zinc pigment is present at a minimum proportion of 1% by weight, based on the weight of the cellulose, and said fiber exhibits sufficient zinc ion release for bactericidal performance over at least 50 machine washes.

2. The fiber according to claim 1, wherein the zinc-containing pigments consist of a mixture or mixed-crystals of zinc oxide and zinc sulfide and at least some of the zinc in the zinc-containing pigments is present in the form of zincates attached to the cellulose.

3. The fiber according to claim 1, wherein the proportion of zinc-containing pigments in the fiber is in the range from 1% to 30% by weight, based on the weight of the cellulose, or more than 30% by weight if present in a nonwoven.

4. The fiber according to claim 2, wherein the release rate and wash durability are determined by the ratio of zinc oxide to zinc sulfide.

5. Functional textiles, fibrous nonwoven webs and self-supporting films/sheets having high whiteness, unrestricted dyeability, UV absorbance and wash-durable bactericidal performance comprising the fiber as claimed in claim 1.

6. The functional textiles, fibrous nonwoven webs and self-supporting films/sheets according to claim 5, wherein the zinc pigment-containing fibers are processed straight or in admixtures into textiles and articles of everyday use.

7. The fiber according to claim 3, wherein the proportion of zinc-containing pigments in the fiber is in the range from 1% to 25% by weight, based on the weight of the cellulose.

8. The fiber according to claim 3, wherein the proportion of zinc-containing pigments in the fiber is in the range from 5% to 20% by weight, based on the weight of the cellulose.

9. A cellulosic fiber as claimed in claim 1, wherein said zinc-containing pigments are extruded in the fiber in a dry-wet extrusion process and mixed in the entire fiber cross-section and said fiber is produced by a process that is not acidic.

10. A cellulosic fiber as claimed in claim 1, wherein said fiber is formed from spinning solution comprising pigments consisting of a mixture of 10 to 99.5% zinc oxide and 0.5 to 90% zinc sulfide, at least some of the zinc in the zinc-containing pigments is present in the form of zincates attached to the cellulose, and said fiber exhibits sufficient zinc ion release for bactericidal performance over at least 50 machine washes.

11. A cellulosic fiber as claimed in claim 10, wherein a fraction of said zinc sulfide has autoxidized into zinc sulfate.

12. Yarn consisting of the fiber as claimed in claim 1, wherein the proportion of zinc-containing pigments in the fiber is in the range from 1% to 30% by weight, the zinc-containing pigments are a mixture or mixed-crystals of zinc oxide and zinc sulfide, and said yarn exhibits textile, processability.

13. The fiber according to claim 1, wherein the proportion of zinc-containing pigments in the fiber is below 5% by weight and said fiber has greater strength than said fiber without said zinc-containing pigments.

14. The fiber according to claim 1, wherein the fiber is produced via a spinning solution having a pH of more than 7 and only basic conditions.

* * * * *

UNITED STATES PATENT AND TRADEMARK OFFICE
CERTIFICATE OF CORRECTION

PATENT NO. : 9,243,349 B2
APPLICATION NO. : 13/058606
DATED : January 26, 2016
INVENTOR(S) : Axel Kolbe et al.

It is certified that error appears in the above-identified patent and that said Letters Patent is hereby corrected as shown below:

Title page: Item (56) References Cited in Foreign Patent Documents:

delete the fourth entry: "CN 1687 509   9/2006"

"DE 1999 34 436 A1" should read --DE 199 34 436 A--

"JP 08060413" should read --JP 08060431--

Signed and Sealed this
Third Day of May, 2016

Michelle K. Lee
*Director of the United States Patent and Trademark Office*